United States Patent
Jansen

(10) Patent No.: US 10,379,210 B2
(45) Date of Patent: Aug. 13, 2019

(54) RADAR SYSTEM AND METHOD THAT UTILIZES OVERLAPPING FREQUENCY RANGES

(71) Applicant: NXP B.V.

(72) Inventor: Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 274 days.

(21) Appl. No.: 15/195,267

(22) Filed: Jun. 28, 2016

(65) Prior Publication Data

US 2017/0023670 A1    Jan. 26, 2017

(30) Foreign Application Priority Data

Jul. 22, 2015 (EP) .................................... 15177911

(51) Int. Cl.
*G01S 13/30* (2006.01)
*G01S 13/93* (2006.01)
(Continued)

(52) U.S. Cl.
CPC .............. *G01S 13/30* (2013.01); *G01S 7/354* (2013.01); *G01S 13/343* (2013.01);
(Continued)

(58) Field of Classification Search
None
See application file for complete search history.

(56) References Cited

U.S. PATENT DOCUMENTS

| | | | | |
|---|---|---|---|---|
| 5,369,409 A | * | 11/1994 | Urabe ................... | G01S 13/931 342/128 |
| 5,448,244 A | * | 9/1995 | Komatsu ............... | G01S 13/345 342/147 |

(Continued)

FOREIGN PATENT DOCUMENTS

| | | |
|---|---|---|
| DE | 10 2013 216 251 A1 | 2/2015 |
| DE | 102014212280 A1 * | 12/2015 ........... G01S 13/931 |

(Continued)

OTHER PUBLICATIONS

Stove, A.G. "Linear FMCW radar techniques", IEE Proceedings F—Radar and Signal Processing, vol. 139, No. 5, 343-350 pgs. (Oct. 1992).
Thurn, D. et al. "A novel interlaced chirp sequence radar concept with range-Doppler processing for automotive applications", IEEE MTT-S Intl. Microwave Symp., 4 pgs. (2015).
Extended European Search Report for Patent Appln. No. 15177911.3 (dated Jan. 29, 2016).

*Primary Examiner* — Bernarr E Gregory
(74) *Attorney, Agent, or Firm* — Rajeev Madnawat

(57) ABSTRACT

A radar system comprising a transmitter controller, configured to control an oscillator such that the oscillator provides a transmit-radar-signal a transmit-first-overlapping-portion and a transmit-second-overlapping-portion that corresponds to the instantaneous frequency of the transmit-first-frequency-overlapping-portion. The transmitter controller is configured to reconfigure the oscillator from a first-operating-mode to a second-operating-mode between a transmit-first-ramp-frequency-portion and a transmit-second-ramp rising-frequency-portion. The radar system also includes a receiver controller configured to receive a received-radar-signal that represents a reflected version of the transmit-radar-signal, and provide a combined-overlapping-portion based on a combination of the transmit-first-overlapping-portion, the transmit-second-overlapping-portion, a received-first-overlapping-portion, and a received-second-overlapping-portion.

15 Claims, 7 Drawing Sheets

(51) Int. Cl.
*G01S 13/58* (2006.01)
*G01S 13/34* (2006.01)
*G01S 7/35* (2006.01)
*G01S 13/00* (2006.01)

(52) U.S. Cl.
CPC .......... *G01S 13/345* (2013.01); *G01S 13/347* (2013.01); *G01S 13/584* (2013.01); *G01S 13/931* (2013.01); *G01S 2007/356* (2013.01); *G01S 2013/9314* (2013.01)

(56) References Cited

U.S. PATENT DOCUMENTS

| | | | | |
|---|---|---|---|---|
| 5,652,589 | A * | 7/1997 | Ono | G01S 13/345 342/70 |
| 5,949,365 | A * | 9/1999 | Wagner | G01S 13/931 342/70 |
| 7,652,616 | B2 * | 1/2010 | Inaba | G01S 13/931 342/104 |
| 9,024,809 | B2 * | 5/2015 | Testar | G01S 13/343 342/109 |
| 9,557,412 | B2 * | 1/2017 | Hilsebecher | G01S 13/931 |
| 2010/0277361 | A1 | 11/2010 | Focke et al. | |

FOREIGN PATENT DOCUMENTS

| | | | |
|---|---|---|---|
| DE | 102014212281 A1 * | 12/2015 | .......... G01S 13/343 |
| EP | 2881752 A1 | 6/2015 | |

* cited by examiner

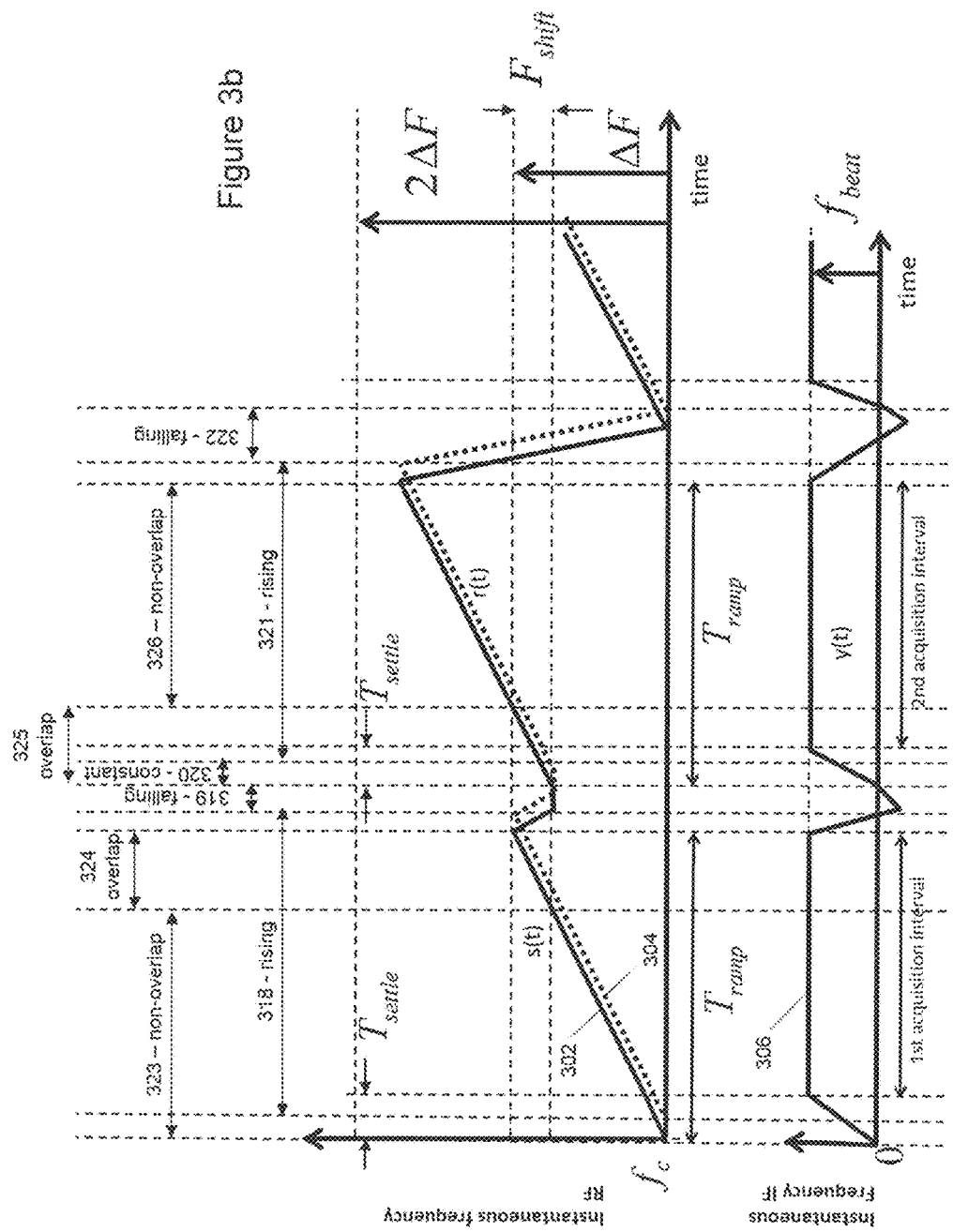

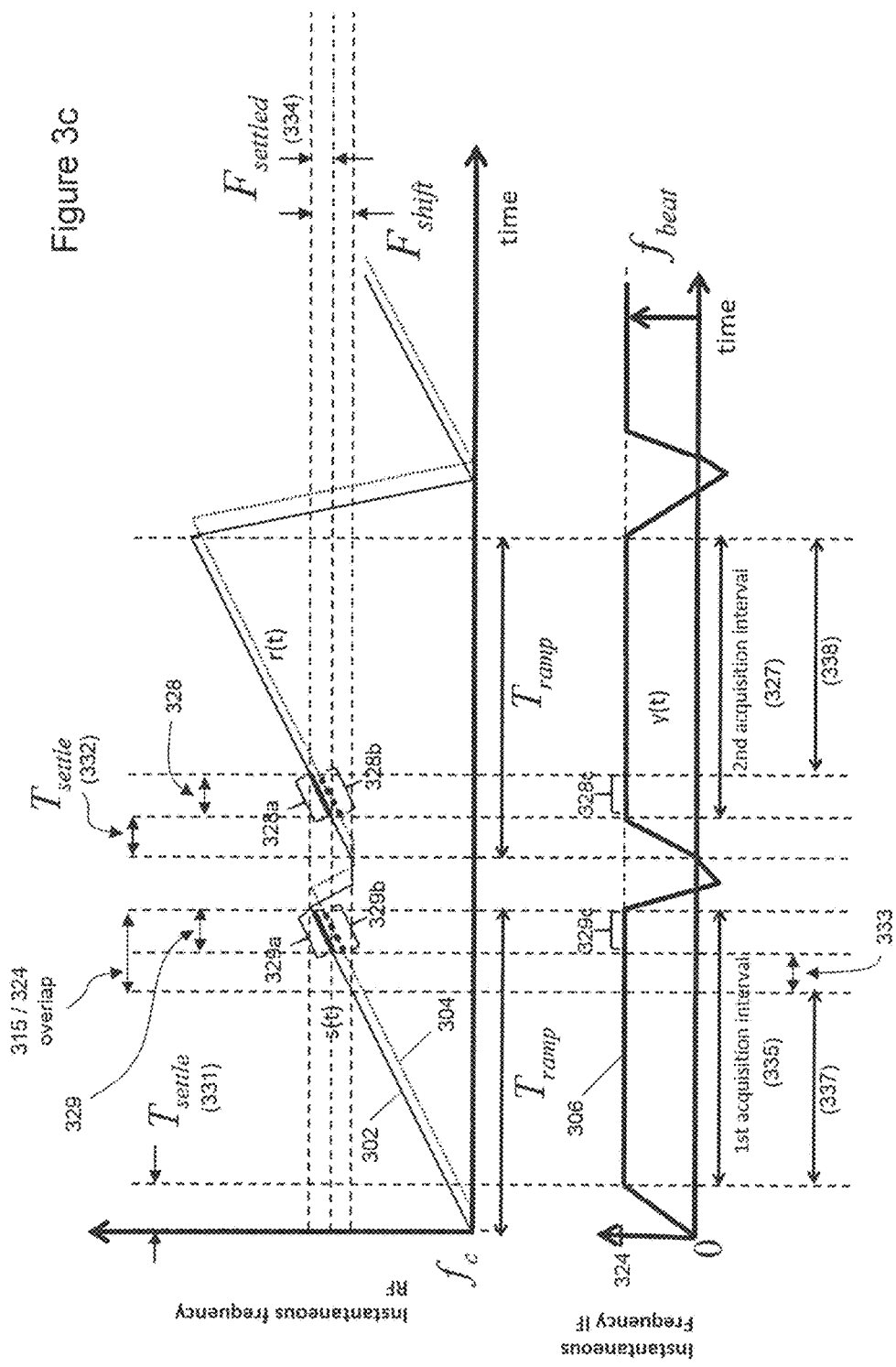

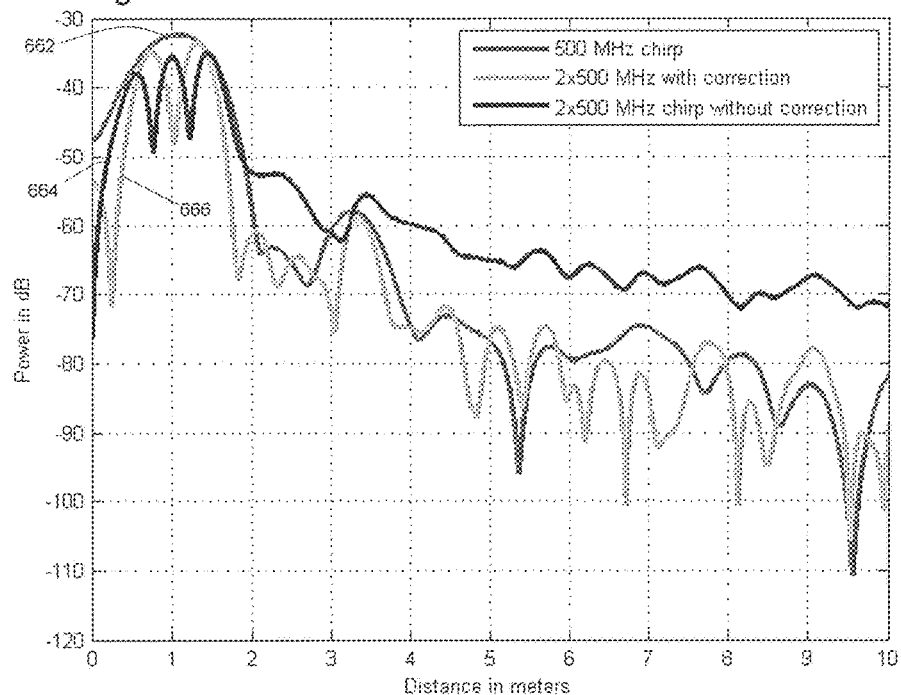
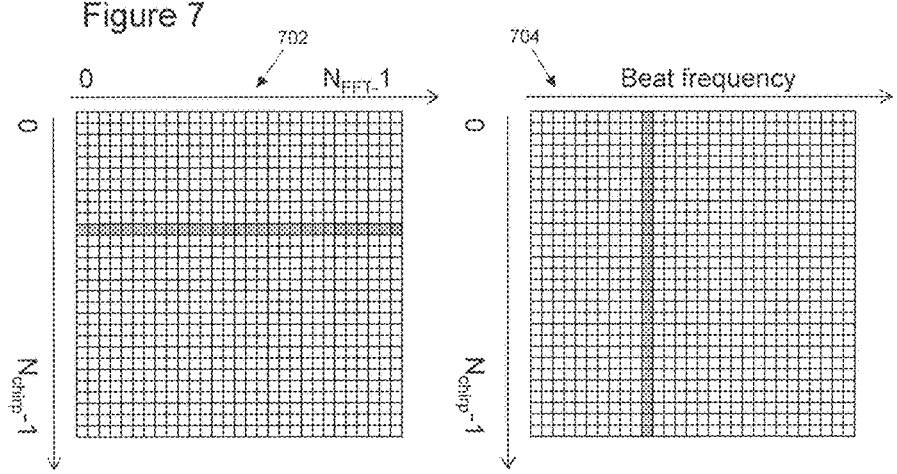

RADAR SYSTEM AND METHOD THAT UTILIZES OVERLAPPING FREQUENCY RANGES

CROSS-REFERENCE TO RELATED APPLICATIONS

This application claims the priority under 35 U.S.C. § 119 of European Patent application no. 15177911.3, filed on Jul. 22, 2015, the contents of which are incorporated by reference herein.

The present disclosure relates to radar systems, including radar systems that can be used to determine a distance to a reflecting object in automotive applications.

Automotive radar systems can increase road safety and driver comfort. The first generation of automotive radar systems targeted automatic cruise control and parking aid applications.

SUMMARY OF THE INVENTION

According to a first aspect of the present disclosure there is provided a radar system comprising:
a) a transmitter controller, configured to control an oscillator such that the oscillator provides a transmit-radar-signal, wherein the transmit-radar-signal comprises:
  a transmit-first-ramp-frequency-portion, during which the frequency of the transmit-radar-signal either increases or decreases over time;
  a transmit-first-returning-frequency-portion, during which the frequency of the transmit-radar-signal changes in the opposite way to the transmit-first-ramp-frequency-portion; and
  a transmit-second-ramp-frequency-portion, during which the frequency of the transmit-radar-signal changes in the same way as the transmit-first-ramp-frequency-portion;
  wherein the transmit-first-ramp-frequency-portion includes:
    a transmit-first-overlapping-portion, and
    a transmit-first-non-overlapping-portion;
  wherein the transmit-second-ramp-frequency-portion includes:
    a transmit-second-overlapping-portion that corresponds to the instantaneous frequency of the transmit-first-frequency-overlapping-portion; and
    a transmit-second-non-overlapping-portion;
  wherein the transmitter controller is configured to reconfigure the oscillator from a first-operating-mode to a second-operating-mode between the transmit-first-ramp-frequency-portion and the transmit-second-ramp-frequency-portion; and
b) a receiver controller configured to:
  receive a received-radar-signal that represents a reflected version of the transmit-radar-signal, wherein the received-radar-signal includes:
    a received-first-ramp-frequency-portion, during which the frequency of the received-radar-signal changes in the same way as the transmit-first-ramp-frequency-portion;
    a received-first-returning-frequency-portion, during which the frequency of the received-radar-signal changes in the opposite way to the transmit-first-ramp-frequency-portion;
    a received-second-ramp-frequency-portion, during which the frequency of the received-radar-signal changes in the same way as the transmit-first-ramp-frequency-portion; and
  wherein the received-radar-signal includes:
    a received-first-overlapping-portion, received at the same time as the transmit-first-overlapping-portion, and
    a received-first-non-overlapping-portion, received at the same time as the transmit-first-non-overlapping-portion;
    a received-second-overlapping-portion, received at the same time as the transmit-second-overlapping-portion, and
    a received-second-non-overlapping-portion, received at the same time as the transmit-second-non-overlapping-portion;
  provide a combined-overlapping-portion based on a combination of the transmit-first-overlapping-portion, the transmit-second-overlapping-portion, the received-first-overlapping-portion, and the received-second-overlapping-portion;
  provide a combined-first-portion based on a combination of the transmit-first-non-overlapping-portion and the received-first-non-overlapping-portion;
  provide a combined-second-portion based on a combination of the transmit-second-non-overlapping-portion and the received-second-non-overlapping-portion;
  provide an output signal in accordance with:
    the combined-overlapping-portion;
    the combined-first-portion; and
    the combined-second-portion.

In one or more embodiments the transmitter controller is configured to operate the oscillator in the first-operating-mode to provide the first-ramp-frequency-portion of the transmit-radar-signal. The transmitter controller may be configured to operate the oscillator in the second-operating-mode to provide the second-ramp-frequency-portion of the transmit-radar-signal.

In one or more embodiments, in order to provide the combined-overlapping-portion, the receiver controller is configured to:
  multiply the transmit-first-overlapping-portion by the received-first-overlapping-portion in order to provide a first-overlapping-portion;
  multiply the transmit-second-overlapping-portion by the received-second-overlapping-portion in order to provide a second-overlapping-portion
  apply a windowing function to the first-overlapping-portion to provide a windowed-first-overlapping-portion;
  apply a windowing function to the second-overlapping-portion to provide a windowed-second-overlapping-portion;
  combine the windowed-first-overlapping-portion with the windowed-second-overlapping-portion to provide the combined-overlapping-portion.

In one or more embodiments the receiver controller is configured to combine the windowed-first-overlapping-portion with the windowed-second-overlapping-portion by adding the windowed-first-overlapping-portion to the windowed-second-overlapping-portion.

In one or more embodiments, in order to provide the combined-overlapping-portion, the receiver controller is configured to:
  multiply the transmit-first-overlapping-portion by the received-first-overlapping-portion in order to provide a first-overlapping-portion;

multiply the transmit-second-overlapping-portion by the received-second-overlapping-portion in order to provide a second-overlapping-portion;

determine a settled-second-overlapping-portion of the second-overlapping-portion, wherein the settled-second-overlapping-portion has a settled frequency value, and wherein the settled-second-overlapping-portion corresponds to the transmit-radar-signal having a second-settled-frequency-range;

determine a settled-first-overlapping-portion of the first-overlapping-portion, and wherein the settled-first-overlapping-portion corresponds to the transmit-first-overlapping-portion having a first-settled-frequency-range, and wherein the first-settled-frequency-range is the same as the second-settled-frequency-range;

apply a windowing function to the settled-first-overlapping-portion to provide a windowed-settled-first-overlapping-portion;

apply a windowing function to the settled-second-overlapping-portion to provide a windowed-settled-second-overlapping-portion; and combine the windowed-settled-first-overlapping-portion with the windowed-settled-second-overlapping-portion to provide the combined-overlapping-portion.

In one or more embodiments, the receiver controller is configured to combine the windowed-settled-first-overlapping-portion with the windowed-settled-second-overlapping-portion by adding the windowed-settled-first-overlapping-portion to the windowed-settled-second-overlapping-portion.

In one or more embodiments the receiver controller is configured to provide the combined-first-portion by multiplying together the transmit-first-non-overlapping-portion and the received-first-non-overlapping-portion.

In one or more embodiments the receiver controller is configured to provide the combined-first-portion by multiplying together the transmit-first-non-overlapping-portion and the received-first-non-overlapping-portion, and removing an unsettled-portion from the result of the multiplication.

In one or more embodiments the receiver controller is configured to provide the combined-second-portion by multiplying together the transmit-second-non-overlapping-portion and the received-second-non-overlapping-portion.

In one or more embodiments the transmitter controller is configured to control the oscillator such that the transmit-radar-signal also comprises:

a transmit-first-constant-frequency-portion, during which the frequency of the transmit-radar-signal is kept substantially constant;

wherein the transmit-first-constant-frequency-portion is after the transmit-first-returning-frequency-portion and before the transmit-second-ramp-frequency-portion.

In one or more embodiments the transmitter controller is configured to reconfigure the oscillator from the first-operating-mode to the second-operating-mode during the transmit-first-constant-frequency-portion.

In one or more embodiments the transmitter controller is configured to set the duration of the transmit-first-constant-frequency-portion such that it is at least as long as the time difference between the transmit-radar-signal and the received-radar-signal. This time difference may be referred to as a time-of-flight.

In one or more embodiments the transmitter controller is configured to control the oscillator such that the transmit-radar-signal also comprises:

a transmit-second-returning-frequency-portion, during which the frequency of the transmit-radar-signal changes in the opposite way to the transmit-first-ramp-frequency-portion;

wherein the transmit-second-returning-frequency-portion is after the transmit-second-ramp-frequency-portion.

In one or more embodiments, the transmit-radar-signal may comprises a plurality of chirps. Each chirp may comprise (i) a transmit-first-ramp-frequency-portion, (ii) a transmit-first-returning-frequency-portion, (iii) a transmit-second-ramp-frequency-portion, and (iv) a transmit-second-returning-frequency-portion.

In one or more embodiments the receiver controller is further configured to determine a distance to a reflecting object based on the output signal.

According to a further aspect of the present disclosure there is provided an integrated circuit comprising any radar system disclosed herein.

There may be provided an automotive radar system comprising any radar system disclosed herein or any IC disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIGS. 3a, 3b and 3c all show an example embodiment of a transmit-radar-signal, a received-radar-signal, and an intermediate-frequency signal;

FIG. 6 shows a plot of power on the vertical axis versus distance on the horizontal axis, for a system tested with two corner reflectors; and FIG. 7 shows schematically a two dimensional FFT.

DETAILED DESCRIPTION OF THE INVENTION

Automotive parking assist systems can be based upon ultra-sonic and/or camera sensors. Car manufacturers are seeking ways to replace the ultra-sonic sensors by radar sensors. Ultra-sonic sensors require openings in the car's fascia in order to let the sound waves pass. These openings can be aesthetically displeasing, and can be exposed to the weather and dirt. Furthermore, these sensors are painted in the same colour as the car's fascia, therefore the car manufacturer has to keep a supply of different sensors.

Backwards facing cameras can also be used as a parking aid. In such a system, a live view of the area behind the car is displayed in the car's centre console. This can require an expensive cabling solution. Furthermore, it can be difficult to accurately estimate the distance between the camera and the objects in front of the camera.

Advantageously, a radar sensor can be mounted behind the car's fascia. As a consequence it is an aesthetically pleasing solution. Moreover, the radar sensor can be more reliable than an ultra-sonic sensor, because it is not exposed to weather influences and dirt.

An important requirement for radar based parking systems is an extremely high distance resolution. Due to practical limitations, known radar systems may not be able to provide a satisfactory distance resolution. For example, radar based parking applications require wide bandwidth waveforms that are difficult to realize in a cost effective way. One or more embodiments disclosed herein can increase this bandwidth.

Figure 1:
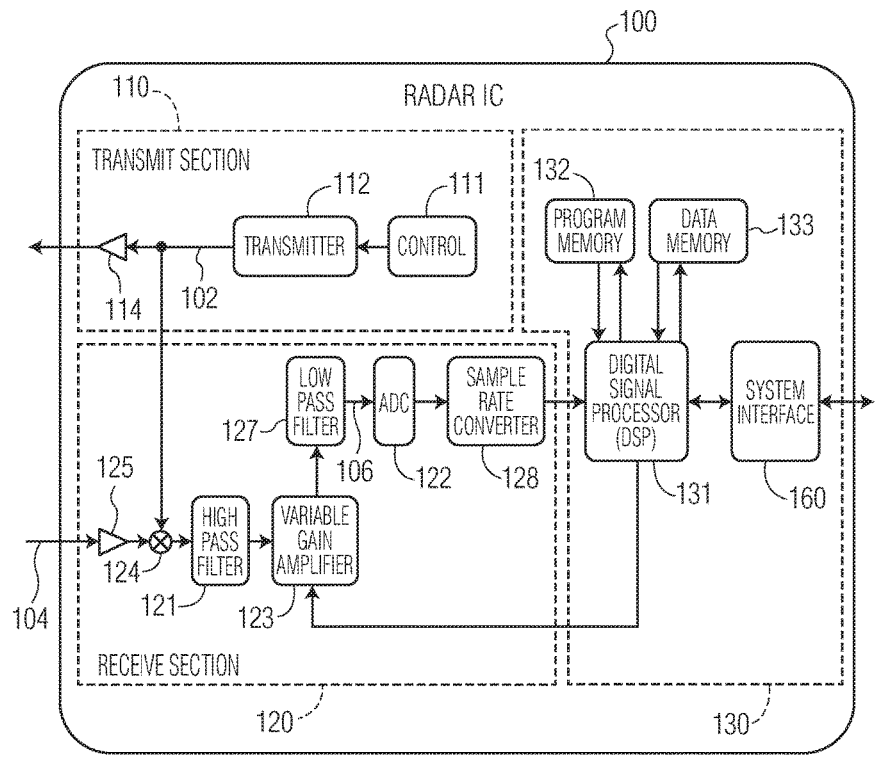
FIG. 1 schematically shows an example embodiment of a radar system.

FIG. 1 schematically shows a radar system 100. It comprises three main sections: a transmit section 110, a receive section 120 and a control and processing section 130. As will be discussed below, a transmit-radar-signal 102, modulated according to a specific waveform principle, is transmitted at a certain carrier frequency (for example 79 GHz).

The transmit section 110 comprises a transmitter controller 111, which may also be referred to as a high-frequency chirp generator. The transmitter controller 111 controls an oscillator, which in this example comprises a phase locked loop (PLL) 112. The PLL 112 is controlled such that it produces a frequency modulated continuous wave (FMCW), which will be referred to as a transmit-radar-signal 102. In this example, the transmit-radar-signal 102 is amplified by a power amplifier 114, and fed, via an antenna output connector (not shown), to a transmit aerial or antenna (not shown) for transmission as a radar signal.

In the presence of a reflective object, a received-radar-signal 104 is received by one or more receive aerials or antenna (not shown), and input via one or more antenna input connectors to the receive section 120. In the figure, one receiver is shown, although it will be appreciated that the system may comprise a different number of receivers, such as two or three or more. The received-radar-signal 104 is amplified by a low noise amplifier 125 and down-converted by a mixer 124 that mixes the received-radar-signal 104 with a copy of the transmit-radar-signal 141. In this example, the down-converted signal provided at the output of the mixer 124 is filtered by a high pass filter 121, amplified by a variable gain amplifier 123 and then filtered by a low pass filter 127. The signal output of the low pass filter 127 may be referred to as an intermediate-frequency (IF) signal 106, and is digitised by an analogue-to-digital converter (ADC) 122.

In this example, the output terminal of the ADC 122 is processed by a sample rate converter 128 and then provided as an input to a digital signal processor 131. The digital signal processor (DSP) 131 is an example of a receiver controller, and forms part of the control and processing section 130. The control and processing section 130 also includes a program memory 132 and a data memory 133. The output from the radar system may be communicated with other electronics within the automobile using a system interface 160 such as a controller area network (CAN) bus.

In summary, then, in a car radar systems—using "car" as an example of the automotive application field—a signal, modulated according to a specific waveform principle, is transmitted at a predetermined carrier frequency. The reflected signals are down-converted to baseband signals by the analogue receiver and processed by the digital part of the system. In these processing steps, one or more of the distance to an object, the relative radial velocity, that is to say, the velocity at which the object is approaching the car, and the angle between the object and the car are calculated.

As mentioned, the modulation system described above uses a frequency modulated continuous wave (FMCW). FMCW is a suitable waveform for automotive radar systems due to its accuracy and robustness. In particular, the implementation in which a sequence of short duration frequency chirps is transmitted can have favourable properties, for detecting objects moving with a non-zero relative radial velocity.

In a FMCW based radar system, the radial distance to a reflecting object is converted to a sine wave oscillating at a beat frequency determined by the slope of the frequency ramp and the time of flight to the object. It is up to the digital baseband to estimate the frequency of the sine wave; in some implementations this may be done by a Fast Fourier Transformation (FFT).

Figure 2:
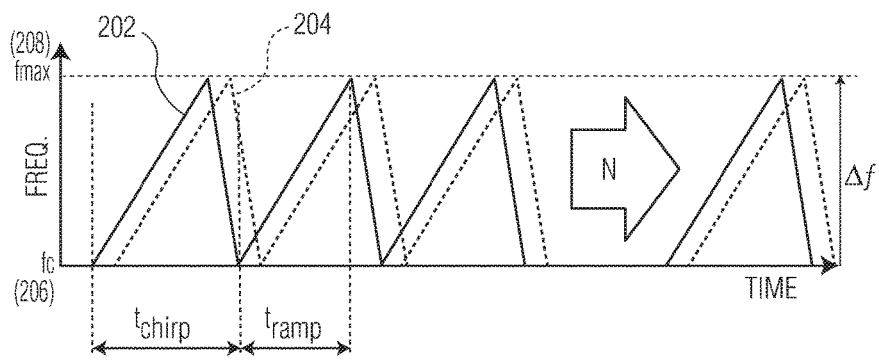
FIG. 2 shows an FMCW chirp sequence of N frequency ramps.

FIG. 2 shows an FMCW chirp sequence of N frequency ramps in a transmit-radar signal 202, and a received-radar-signal 204. Instantaneous frequency is shown on the vertical axis in FIG. 2, and time is shown on the horizontal axis. The frequency of each chirp varies between a carrier frequency (fc) 206 and a maximum frequency (fmax) 208. Each chirp has a duration of $T_{chirp}$, and ramp-period $T_{ramp}$ during which the frequency of the chirp increases. It will be appreciated that in some examples, a ramp-period during which the frequency of the chirp decreases can be used.

The difference between the carrier frequency (fc) 206 and the maximum frequency (fmax) 208 is the bandwidth of the ramp/chirp ($\Delta f$), and can be limited by the performance of the PLL. For example, the frequency range of the PLL may be set by selection of one of a plurality of hardware configurations that is suitable for a frequency spectrum that is assigned to the radar system. As a consequence, the bandwidth of the chirp ($\Delta f$) can be limited by the bandwidth of the hardware configuration that is in use.

As can be seen from FIG. 2, the received-radar-signal 204 is delayed in time with respect to the transmit-radar signal 202. The time delay is due to the propagation time between the radar system and the reflecting object in the forward and backward direction.

In a FMCW system, a sine wave with an increasing or decreasing frequency is transmitted, as indicated by the slopes of the frequency-domain plots of the transmit-radar signal 202 and the received-radar-signal 204. The instantaneous frequency difference between the transmit-radar signal 202 and the received-radar-signal 204 is constant for at least part of the duration of a frequency ramp.

As discussed above with reference to FIG. 1, in the down-conversion operation the transmit-radar signal 202 is mixed with the received-radar-signal 204 (which is a time delayed version of the transmit-radar signal 202). In case the relative velocity between the radar system and the reflecting object is zero the received-radar-signal 204 is an attenuated, time delayed, and phase rotated version of the transmit-radar signal 202. The result of the down-conversion and subsequent low pass filtering operations is a sine wave that oscillates at the beat frequency. The beat frequency depends on the distance to the reflecting object D, the difference between the start and the stop frequency of the ramp Δf (as shown in FIG. 2) and the duration of the ramp $t_{ramp}$:

$$f_{beat} = \frac{\Delta f}{tramp} \frac{2D}{c0} \quad (1)$$

where c0 is equal to the speed of light.

In case the relative velocity is non-zero, the corresponding Doppler frequency is added to the beat frequency. In this system however the duration of the chirp is very short, for example shorter than 100 us, and the frequency deviation is at least several tens of MHz. As a result the Doppler frequency is very small compared to the beat frequency and can be ignored in the calculation of the distance. The Doppler component will, however, change the phase of the received frequency ramp. A well-known technique, the two dimensional Fast Fourier Transformation (FFT), is used to calculate the relative radial velocity. This technique is further explained below with reference to FIG. 7.

In FMCW radar systems, the relation between the distance and the beat frequency is linear. The beat frequency increases with increasing distance to the reflecting object. In practice, multiple reflections can be present in the field of view of the radar system. In this case, the output of the down-conversion operation is a summation of sine waves oscillating at the beat frequencies corresponding to the distances to the reflecting objects.

Distance Resolution

The illumination of two reflecting objects in the radar's field of view results in an IF (intermediate frequency) signal at the input of the ADC that consists of the summation of two sine waves oscillating at their respective beat frequencies. The resolution of the radar system defines how close these two objects can be located while still being perceived by the radar system as two separate objects. In FMCW radar system terminology, the first zero crossing bandwidth of the frequency domain response is used as a measure of the resolution. The relationship between this bandwidth and resolution in meters will be explained below.

The zero crossing bandwidth is equal to the inverse of $T_{FFT}$, where $T_{FFT}$ is the duration of the acquisition interval in each frequency ramp. The acquisition interval and $T_{FFT}$ will be discussed below with reference to FIGS. 3a to 3c. Therefore, the beat frequency of the second reflecting object needs to be at least $T_{FFT}^{-1}$ Hz higher or lower than the beat frequency of the first reflecting object to be separately identifiable. This translates in the requirement that the beat frequency needs to increase by $T_{FFT}^{-1}$ Hz in the additional time Δτ it takes the transmitted signal to travel $D_{RES}$ meters, where $D_{RES}$ is the resolution distance of the radar system. This additional time is given by:

$$\Delta\tau = \frac{2D_{RES}}{c_0} \quad (2)$$

The increase or decrease in beat frequency is now described by:

$$\Delta f_{beat} = \frac{\Delta f}{T_{ramp}} \Delta\tau \quad (3)$$

This increase in beat frequency has to be at least $T_{FFT}^{-1}$ Hz. Therefore:

$$\frac{\Delta f}{T_{ramp}} \frac{2D_{res}}{c_0} = \frac{1}{T_{FFT}} \quad (4)$$

From (4), it follows that $D_{RES}$ is equal to:

$$D_{RES} = \frac{T_{ramp}}{T_{FFT}} \frac{c_0}{2\Delta f} \quad (5)$$

From (5), it follows that the distance resolution of the FMCW radar system is inversely proportional to the bandwidth of the frequency ramp (Δf) during the sampling interval.

Figure 3A:
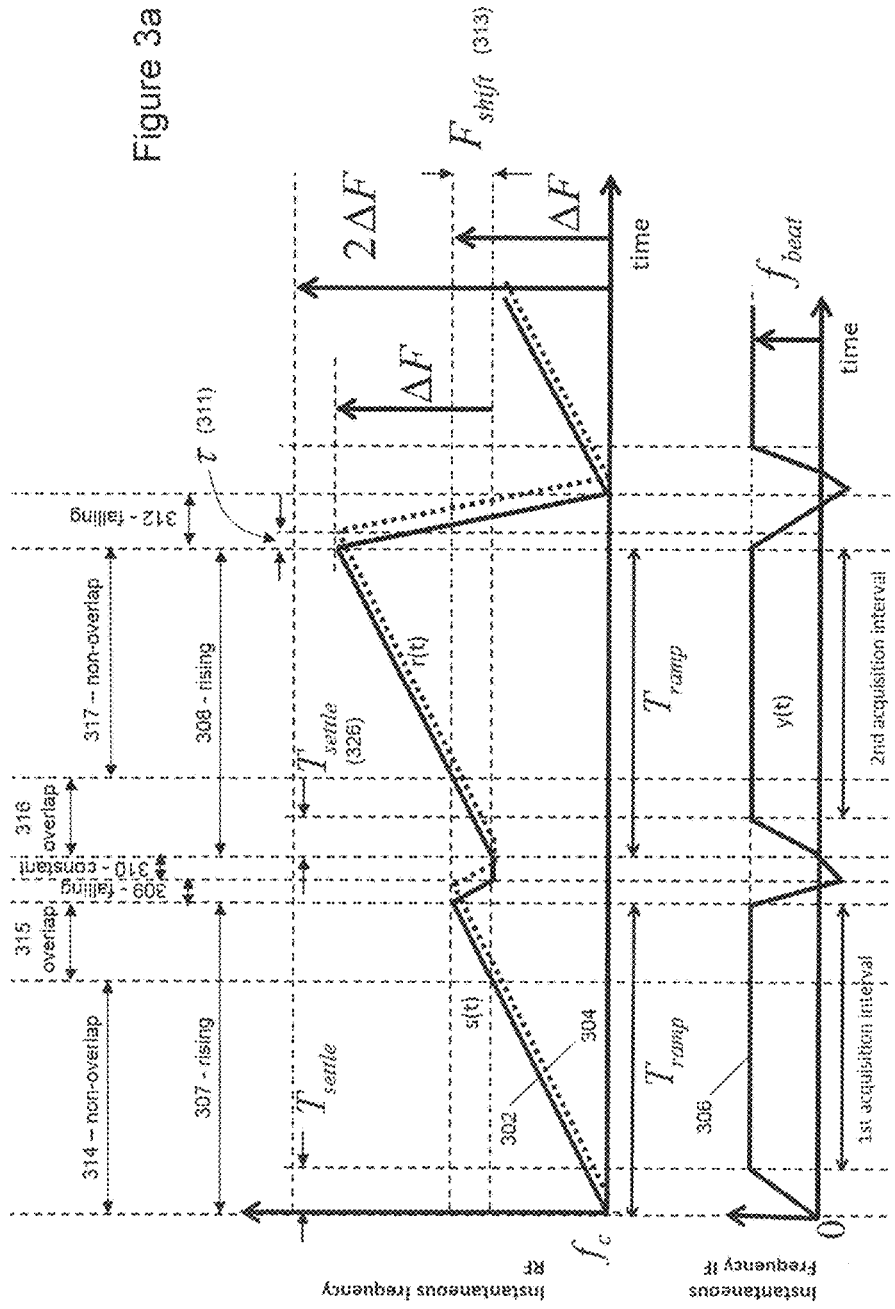

FIGS. 3a, 3b and 3c all show an example embodiment of a transmit-radar-signal 302, a received-radar-signal 304, and an intermediate-frequency (IF) signal 306. The transmit-radar-signal 302 can be provided by the PLL of FIG. 1. The received-radar-signal 304 can be received by the receive section of FIG. 1. The IF signal 306 can be provided to the ADC of FIG. 1. In this way, the IF signal 306 is a filtered version of the product of the transmit-radar-signal 302 and the received-radar-signal 304. Features of the transmit-radar-signal 302 are labelled in FIG. 3a. Features of the received-radar-signal 304 are labelled in FIG. 3b. FIG. 3c is mainly used to discuss overlapping portions of the transmit-radar-signal 302 and the received-radar-signal 304.

The time delay between the transmit-radar-signal 302 and the received-radar-signal 304 is shown in FIGS. 3a-3c with the symbol τ 311 and represents the time of flight of the radar signal to and from the reflecting object.

With reference to FIG. 3a, the transmit-radar-signal 302 includes two sub-ramps, which will be referred to as a transmit-first-rising-frequency-portion 307 and a transmit-second rising-frequency-portion 308. The frequency of the transmit-radar-signal 302 increases over time during both of these portions. It can be seen that the frequency of the transmit-first-rising-frequency-portion 307 starts at the carrier frequency, and stops rising when the frequency has increased by a Δf. In the same way as described with reference to FIG. 2, Δf is a limitation that is imposed by the hardware of the PLL. In contrast to the waveforms of FIG. 2 however, after the transmit-first-falling-frequency portion 309, the high-frequency chirp generator reconfigures the PLL from a first-operating-mode to second-operating-mode, for example so that the PLL utilises a different hardware configuration.

Then, when the PLL is in the second-operating-mode, the transmit-second rising-frequency-portion 308 increases the frequency by a further amount equal to Δf. As will be discussed below, use of the two sub-ramps with different PLL configurations enables the bandwidth of the combined frequency ramp during a sampling interval to be increased. Therefore, in accordance with equation (5) above, it follows that the distance resolution ($D_{RES}$) of the FMCW radar system is advantageously reduced. This is because $D_{RES}$ is inversely proportional to the bandwidth of the frequency ramp.

In this way, the PLL is operated in the first-operating-mode to provide the first rising-frequency-portion 307 of the transmit-radar-signal 302, and is operated in the second-operating-mode to provide the second rising-frequencyportion 308 of the transmit-radar-signal 302. Therefore, a second frequency ramp can be used that has a frequency deviation that does not fit in the sweep bandwidth of the waveform generator PLL when it is in the first-operating-mode.

As will be discussed in more detail below, the frequency ranges of the transmit-first-rising-frequency-portion 307 and the transmit-second rising-frequency-portion 308 can be controlled such that they overlap. The overlapping portions can then be processed such that any phase distortions between the end of the transmit-first-rising-frequency-portion 307 and the start of the transmit-second rising-frequency-portion 308 can be reduced.

The transmit-radar-signal 302 of FIG. 3 includes the following portions:
- a transmit-first-rising-frequency-portion 307, during which the frequency of the transmit-radar-signal increases 302 over time;
- a transmit-first-falling-frequency portion 309, during which the frequency of the transmit-radar-signal 302 decreases over time;
- a transmit-first-constant-frequency portion 310, during which the frequency of the transmit-radar-signal 302 is kept substantially constant;
- a transmit-second rising-frequency-portion 308, during which the frequency of the transmit-radar-signal 302 increases over time; and
- a transmit-second-falling-frequency portion 312, during which the frequency of the transmit-radar-signal 302 decreases over time.

In some examples, the PLL is reconfigured after the transmit-first-falling-frequency portion 309. For this reason, the substantially constant portion 310 can also be referred to as $T_{switch}$.

Due to the transmit-first-falling-frequency portion 309, which occurs temporally between the transmit-first-rising-frequency-portion 307 and the transmit-second rising-frequency-portion 308, the starting frequency of the transmit-second rising-frequency-portion 308 is less than the end frequency of the transmit-first-rising-frequency-portion 307. This results in an overlap in the frequency ranges of the transmit-first-rising-frequency-portion 307 and the transmit-second rising-frequency-portion 308. This overlap in frequency range is shown in FIG. 3a as $F_{shift}$ 313. On the time axis of FIG. 3a, the overlapping frequency range corresponds to a transmit-first-overlapping-portion 315 in the transmit-first-rising-frequency-portion 307, and a transmit-second-overlapping-portion 316 in the transmit-second-rising-frequency-portion 308. Therefore, the transmit-first-rising-frequency-portion 307 also includes a transmit-first-non-overlapping-portion 314; and the transmit-second-rising-frequency-portion 308 also includes a transmit-second-non-overlapping-portion 317.

The frequency range of the transmit-first-overlapping-portion 315 corresponds to the frequency range of the transmit-second-frequency-overlapping-portion 316. The frequency range of the transmit-first-non-overlapping-portion 314 is less than that of the transmit-first-overlapping-portion 315. The frequency range of the transmit-second-non-overlapping-portion 317 is greater than that of the transmit-second-overlapping-portion 316.

The transmit-second-falling-frequency portion 312 enables the instantaneous frequency of the chirp to return to the carrier frequency ($f_c$) for the start of the next chirp, and can be considered as a reset phase. During the transmit-second-falling-frequency portion 312, the PLL is reconfigured back to the first operating mode. There can be a small step in the transmit-radar-signal 302 during the reset phase, as the transmit-radar-signal returns to the carrier frequency. No significant signal processing may be required to account for this step because it does not occur during an acquisition interval.

Turning now to FIG. 3b, and the received-radar-signal 304. It is recalled that the received-radar-signal 304 represents a reflected version of the transmit-radar-signal 302. Therefore, the received-radar-signal 304 includes similar portions to the transmit-radar-signal 302. More particularly, the received-radar-signal 304 includes:
- a received-first-rising-frequency-portion 318, during which the frequency of the received-radar-signal 304 increases over time;
- a received-first-falling-frequency portion 319, during which the frequency of the received-radar-signal 304 decreases over time;
- a received-first-constant-frequency portion 320, during which the frequency of the received-radar-signal 304 is kept substantially constant;
- a received-second rising-frequency-portion 321, during which the frequency of the received-radar-signal 304 increases over time; and
- a received-second-falling-frequency portion 322, during which the frequency of the received-radar-signal 304 decreases over time.

As with the transmit-radar-signal 302, the received-radar-signal 304 includes a received-first-non-overlapping-portion 323 and a received-first-overlapping-portion 324. Also, the received-second-rising-frequency-portion 321 includes a received-second-overlapping-portion 325 and a received-second-non-overlapping-portion 326. Each of these portions is defined as being received at a time that corresponds to the equivalently named portions of the transmit-radar signal 302.

Turning now to FIG. 3c, the IF signal 306 will be described. As indicated above, the IF signal 306 is the product of the transmit-radar-signal 302 and the received-radar-signal 304.

A settling-portion ($T_{settle}$) 331 occurs at the start of the chirp. The IF signal 306 is building up to its beat-frequency level ($f_{beat}$) 324 during the settling-portion 331, whilst the frequencies of the transmit-radar-signal 302 and the received-radar-signal 304 increase from the zero frequency level. This settling-portion ($T_{settle}$) 331 of the IF signal 306 is an example of an unsettled-portion, which is excluded from a first acquisition interval 335.

A first acquisition interval 335 starts when the IF signal 306 reaches its beat-frequency level 324, after the initial settling time has expired. Once the IF signal 306 has reached its beat frequency, it can be said to have reached a settled frequency value. As is known in the art, the DSP can determine that an initial settling time has expired, and that the signal is "back at the receiver" within a given time (based upon the maximum distance of the radar). The PLL may also need some time to settle to linear behaviour. In some examples a few micro-seconds can be reserved for this processing. The precise timing can be generated by a timing generator inside the radar. The first acquisition interval 335 then continues until the transmit-radar-signal 302 starts falling (the transmit-first-falling-frequency portion 309). The duration of the first acquisition interval 335 can be referred to as $T_{FFT}$. When the transmit-radar-signal 302 is falling and the received-radar-signal 304 is still rising, there will not be a constant difference between the frequency levels of the two signals, and therefore the IF signal 306 is no longer representative of the distance to the reflected object in the same way as it was before. The duration of the transmit-first-falling-frequency portion 309 can be set such that there is a sufficient overlap in frequency between the transmit-radar-signal 302 and the received-radar-signal 304 to enable the overlapping portions to be combined in an acceptable way, as will be described in more detail below with reference to FIG. 4.

In this way, a combined-first-portion 337 of the IF signal 306 is provided, which includes a combination of the transmit-first-non-overlapping-portion 314 and the received-first-non-overlapping-portion 323. In this example, the combined-first-portion 337 includes the result of multiplying (using the mixer of FIG. 1, for example) together the transmit-first-non-overlapping-portion 314 and the received-first-non-overlapping-portion 323, and removing an unsettled-portion 331 from the result of the multiplication. Also, the first acquisition interval 335 includes a combination of part of the transmit-first-overlapping-portion 315 and a part of the received-first-overlapping-portion 324. More particularly, the first acquisition interval 335 includes a combination of a first-portion 333 of the transmit-first-overlapping-portion 315 that has the same frequency range as an unsettled-transmit-second-overlapping-portion 332 (as described below), and the part of the received-first-overlapping-portion 324 that is received at the same time that the first-portion 333 is transmitted.

After the transmit-first-falling-frequency portion 309, the transmit-radar-signal 302 then begins the transmit-first-constant-frequency portion 310. The duration of the transmit-first-constant-frequency portion 310 can be at least as long as the time-of-flight τ 311 of the radar signal. In this example, the duration of the transmit-first-constant-frequency portion 310 is the same as the time-of-flight τ 311. In this way, the received-radar-signal 304 falls to the constant value just as the transmit-radar-signal 302 leaves the same constant value. At this instant in time, the beat frequency of the IF signal is zero because the frequency of the received-radar-signal 304 is the same as the frequency of the transmit-radar-signal 302.

Then, at the start of the transmit-second rising-frequency-portion 308, there is another settling-portion ($T_{settle}$) during which the IF signal 306 settles to the correct beat frequency value 324. Once the IF signal 306 has settled, a second acquisition interval 327 begins, in the same way as the first acquisition interval 335 that is described above. The transmit-second-overlapping-portion 316 begins at the start of the transmit-second rising-frequency-portion 308 and ends a period of time after the settling-portion ($T_{settle}$) has finished. That is, the transmit-second-overlapping-portion 316 and the settling-portion ($T_{settle}$) 332 start at the same time, but the transmit-second-overlapping-portion 316 is longer than the settling-portion ($T_{settle}$) 332. Therefore, the transmit-second-overlapping-portion 316 can be comprised of: a settled-transmit-second-overlapping-portion 328a and an unsettled-transmit-second-overlapping-portion 332. The received-second-overlapping-portion 325 can similarly include a settled-received-second-overlapping-portion that occurs at the same time as the corresponding settled-transmit-second-overlapping-portion.

In this way, a combined-second-portion 338 of the IF signal 306 is provided, which includes a combination of the transmit-second-non-overlapping-portion 317 and the received-second-non-overlapping-portion 326. In this example, the combined-second-portion 338 includes the result of multiplying (using the mixer of FIG. 1, for example) together the transmit-second-non-overlapping-portion 317 and the received-second-non-overlapping-portion 326

Turning now to the transmit-first-rising-frequency-portion 307, the transmit-first-overlapping-portion 315 can be said to have a settled-transmit-first-overlapping-portion 329a, which corresponds to the same frequency range as the settled-transmit-second-overlapping-portion 328a. The remainder of the transmit-first-overlapping-portion 315 however is not unsettled.

It will be appreciated from the above description that the first acquisition interval 335 ends with a settled-transmit-first-overlapping-portion 329a, and the second acquisition interval 327 has a settled-transmit-second-overlapping-portion 328a at its start (which is not at the start of the received-second-rising-frequency-portion 321 because of the settling portion $T_{settle}$). The settled-transmit-first-overlapping-portion 329a and the settled-transmit-second-overlapping-portion 328a of the transmit-radar signal 302 have the same frequency range.

For the duration of the settled-transmit-first-overlapping-portion 329a, the received-first-rising-frequency-portion 318 defines a settled-received-first-overlapping-portion 329b. Similarly, for the duration of the settled-transmit-second-overlapping-portion 328a, the received-second-rising-frequency-portion 321 defines a settled-received-second-overlapping-portion 328b.

The IF signal 306, includes a settled-first-overlapping-portion 329c, which is the product of the settled-transmit-first-overlapping-portion 329a and the settled-received-first-overlapping-portion 329b. The settled-first-overlapping-portion 329c of the IF signal 306 corresponds to the same period of time (shown with reference 329 in FIG. 3c) as the settled-transmit-first-overlapping-portion 329a and the settled-received-first-overlapping-portion 329b. The settled-first-overlapping-portion 329c of the IF signal 306 corresponds to the transmit-radar-signal 302 having a first-settled-frequency-range ($F_{settled}$ 334).

Similarly, the IF signal 306 includes a settled-second-overlapping-portion 328c, which is the product of the settled-transmit-second-overlapping-portion 328a and the settled-received-second-overlapping-portion 328b. The settled-second-overlapping-portion 328c of the IF signal 306 corresponds to the same period of time (shown with reference 328 in FIG. 3c) as the settled-transmit-second-overlapping-portion 328a and the settled-received-second-overlapping-portion 328b. The settled-second-overlapping-portion 328c of the IF signal 306 corresponds to the transmit-radar-signal 302 having a second-settled-frequency-range ($F_{settled}$ 334), which is the same as the first-settled-frequency-ranges.

Each of the settled overlapping portions are shown in bold in FIG. 3c.

It will be appreciated that a system can also be provided in which the slopes of FIGS. 3a to 3c are negated/reversed. Thus chirps shown as rising in FIGS. 3a to 3c can instead be falling, and vice versa. That is, the transmit-first-rising-frequency-portion is an example of a transmit-first-ramp-frequency-portion. During a transmit-first-ramp-frequency-portion, the frequency of the transmit-radar-signal either increases or decreases over time. Therefore, all other portions that are described herein as rising-frequency-portions can be considered as examples of ramp-frequency-portions, during which the frequency changes in the same way as the transmit-first-ramp-frequency-portion. Similarly, all portions that are described herein as falling-frequency-portions can be considered as examples of returning-frequencyportions, during which the frequency changes in the opposite way to the transmit-first-ramp-frequency-portion.

Also, the transmit-radar-signal 302 in this example includes a plurality of chirps, where each chirp includes (i) the transmit-first-rising-frequency-portion 307, (ii) the transmit-first-falling-frequency-portion 309, (iii) the transmit-first-constant-frequency portion 310, (iv) the transmit-second-rising-frequency-portion 308, and (v) the transmit-second-falling-frequency-portion 312. Similarly, the received-radar-signal 304 includes a plurality of chirps, where each chirp includes (i) the received-first-rising-frequency-portion 318, (ii) the received-first-falling-frequency-portion 319, (iii) the received-first-constant-frequency portion 320, (iv) the received-second-rising-frequency-portion 321, and (v) the received-second-falling-frequency-portion 322.

As will be discussed below with reference to FIG. 4, a combined-overlapping-portion can be determined based on a combination of the settled-transmit-first-overlapping-portion 329a, the settled-received-first-overlapping-portion 329b, the settled-transmit-second-overlapping-portion 328a, and the settled-received-second-overlapping-portion 328b.

In the digital domain, two sets of samples (one that corresponds to the first acquisition interval 335 and one that corresponds to the second acquisition interval 327) are available for the combined ramp. When combined, the two sets of samples correspond to a FMCW frequency ramp of nearly twice the bandwidth (AO that can be provided by a single configuration of the PLL. However, there can be a possible phase discontinuity between the last sample of the first acquisition interval 335 and the first sample of the second acquisition interval 327. This phase discontinuity can distort the frequency spectrum of the combined sampling intervals.

Derivation of the Phase Discontinuity

The phase of the IF signal 306 of the last sample of the first acquisition interval 335 in radians is given for the case of a single reflecting object:

$$\varphi(T_{ramp}) = 2\pi(f_c + \Delta f)\tau - \pi \frac{\Delta f}{T_{ramp}}\tau^2 \quad (6)$$

During the transmit-first-falling-frequency portion 309 (which may be referred to as a reset phase), the instantaneous frequency of the transmitted frequency ramp is lowered by $F_{shift}$ and remains constant for at least $\tau$ seconds. Therefore the phase of the IF signal 306 is equal to $2\pi(f_c + \Delta F - F_{shift})\tau$ after $\tau$ seconds. After the constant frequency period the transmitted frequency increases once more. During the r first seconds the received IF signal is described by:

$$S_{IF}(t) = \quad (7)$$
$$\exp\left(j2\pi(f_c + \Delta f - F_{shift})\tau + j\pi\frac{\Delta f}{T_{ramp}}(t - T_{ramp} - T_{reset} - T_{switch})^2\right)$$
for $T_{ramp} + T_{reset} + T_{switch} < t < T_{ramp} + T_{reset} + T_{switch} + \tau$ At $(T_{ramp}+T_{reset}+T_{switch}+\tau)$ seconds the IF signal is described by:

$$S_{IF}(T_{ramp} + T_{reset} + T_{switch} + \tau) = \quad (8)$$
$$\exp\left(j2\pi(f_c + \Delta f - F_{shift})\tau + j\pi\frac{\Delta f}{T_{ramp}}\tau^2\right)$$

After $\tau$ seconds the received signal has an increasing frequency as well, therefore a component oscillating at the beat frequency is added. During the next $(T_{reset}-\tau)$ seconds the IF signal is described by:

$$S_{IF}(t) = \exp\left(j2\pi(f_c + \Delta f - F_{shift})\tau + \quad (9)\right.$$
$$\left. j2\pi\frac{\Delta f}{T_{ramp}}\tau(t - T_{ramp} - T_{reset} - T_{switch} - \tau) + j\pi\frac{\Delta f}{T_{ramp}}\tau^2\right)$$

The signal at the first sample of the second acquisition interval is given by:

$$\varphi(T_{ramp} + T_{reset} + T_{switch} + T_{settle}) = \quad (10)$$
$$2\pi\left(f_c + \Delta f - F_{shift} + \frac{\Delta f}{T_{ramp}}T_{settle}\right)\tau - \pi\frac{\Delta f}{T_{ramp}}\tau^2$$

Comparing the phase of Equation 6 with the phase of Equation 10 the phase discontinuity is given by:

$$\varphi(T_{ramp} + T_{reset} + T_{switch} + T_{settle}) = 2\pi\left(\frac{\Delta f}{T_{ramp}}T_{settle} - F_{shift}\right)\tau \quad (11)$$

The phase discontinuity is distance dependent as it depends on the time of flight. In a FMCW system this dependency is translated to frequency.

In theory the phase of Equation 11 can be made zero by choosing $$F_{shift} = \frac{\Delta f}{T_{ramp}}T_{settle}.$$

However, small deviations might occur due to transients in the receiver and transmitter chain. These transients could cause amplitude and small phase jumps between the end of the first acquisition interval and the start of the second acquisition interval.

Spectral Distortion Due to the Phase Discontinuity

To understand the influence of a phase discontinuity on a FMCW radar system it is useful to first examine the scenario in which one continuous frequency ramp is divided into a first and second acquisition interval of equal length. In the FMCW system of FIG. 1, distance is represented by the magnitude of the frequency of the IF signal. Thus the distance is estimated by evaluating the frequency spectrum of the IF signal. The combination of both acquisition intervals can be made in the time domain or the frequency domain. Here, a frequency domain combination is explained. To that extent, the length of acquisition interval is doubled by zero padding. The first interval is padded by appending zeros, and the second interval is padded by prepending zeros.

The magnitude of the frequency spectrum of each (zero padded) acquisition interval is equal. The phase of the spectrum of the second acquisition interval is shifted compared to the phase of the spectrum of the first interval. This phase shift is due to the time shift of the second interval and different start frequency.

Thus, this phase shift depends on the duration of the acquisition interval and the frequencies at which the spectrum is evaluated. If both spectra would be added together, then they would add coherently at some frequencies and destructively at other frequencies. In this case, the spectra add coherently at the peak amplitude of a spectrum corresponding to a single reflecting object. The spectrum of the first and second acquisition interval are $X_1(n)$ and $X_2(n)$ respectively. Then the second spectrum is given by:

$$X_2(n) = \tag{12}$$
$$X_1(n)\exp\left(-j2\pi T_{ramp}\frac{F_{sample}}{2N}n + j2\pi \Delta f \tau\right) \text{ for } -N < n < N-1$$

$$\tau = F_{beat}\frac{T_{ramp}}{\Delta f}$$

$$X_2(n) = X_2(n)\exp\left(-j2\pi T_{ramp}\frac{F_{sample}}{2N}n + j2\pi F_{beat}T_{ramp}\right) \text{ for } -N <$$
$$n < N-1$$

$$X_2(n) = X_2(n)\exp\left(j2\pi T_{ramp}\left\{F_{beat} - \frac{F_{sample}}{2N}n\right\}\right) \text{ for } -N <$$
$$n < N-1$$

$$X_1(n) + X_2(n) =$$
$$X_1(n)\left[1 + \exp\left(j2\pi T_{ramp}\left\{F_{beat} - \frac{F_{sample}}{2N}n\right\}\right)\right] \text{ for } -N < n < N-1$$

$$|X_1(n) + X_2(n)| =$$
$$2X_1(n)\cos\left(\pi T_{ramp}\left\{F_{beat} - \frac{F_{sample}}{2N}n\right\}\right) \text{ for } -N < n < N-1$$

where $$F_{beat} - \frac{F_{sample}}{2N}n,$$

the cosine term equals 1, and constructive addition occurs at the frequency where the beat signal reaches its spectral peak. When n=n+1

$$|X_1(n+1) + X_2(n+1)| = 2X_1(n)\cos\left(-\pi T_{ramp}\frac{F_{sample}}{2N}\right)$$
$$= 2X_1(n)\cos\left(-\frac{\pi}{2}\right)$$
$$= 0$$

Thus, destructive addition occurs one sample to the right (or left) of the maximum. This destructive addition reduces the width of the spectral response and thereby increases the resolution. If there is another phase term in Equation 12 then the coherent addition shifts in frequency, with the result that spectral distortion occurs.

Returning now to the example embodiment of FIGS. 3a to 3c, the frequency shift $F_{shift}$ 313 can cause a phase discontinuity between the end of the first acquisition interval 335 and the start of the second acquisition interval 327. That is, in the scenario described above, the desired coherent and destructive addition pattern is lost. It has been found that simply combining the first acquisition interval 335 and the second acquisition interval 327 without correction can result in loss of resolution, and formation of undesired ghost targets.

It is recalled that the phase discontinuity of equation 11 is distance dependent. That is, a first reflecting object causes a phase shift which is different from the phase shift caused by a second reflecting object, which is at a different distance to the radar than the first object. The distance is converted to a beat frequency in a FMCW system. Thus the linear phase relationship of equation 11 is converted into a linear phase shift over beat frequency in the frequency domain.

It will be appreciated from the above description that FIG. 3 relates to an example embodiment that has two consecutive sub-ramps. The radar system can make use of a sequence of FMCW waveforms. Each frequency ramp consists of two consecutive frequency sub-ramps separated by a small time interval in which the PLL can be reconfigured. The instantaneous frequency of the second sub-ramp at the beginning of the second acquisition interval is close to the instantaneous frequency at the end of the first acquisition interval. The instantaneous frequency can be precisely controlled by a transmitter controller (which is an example of a waveform generator) and can be highly predictable.

Time Domain Solution

Figure 4:
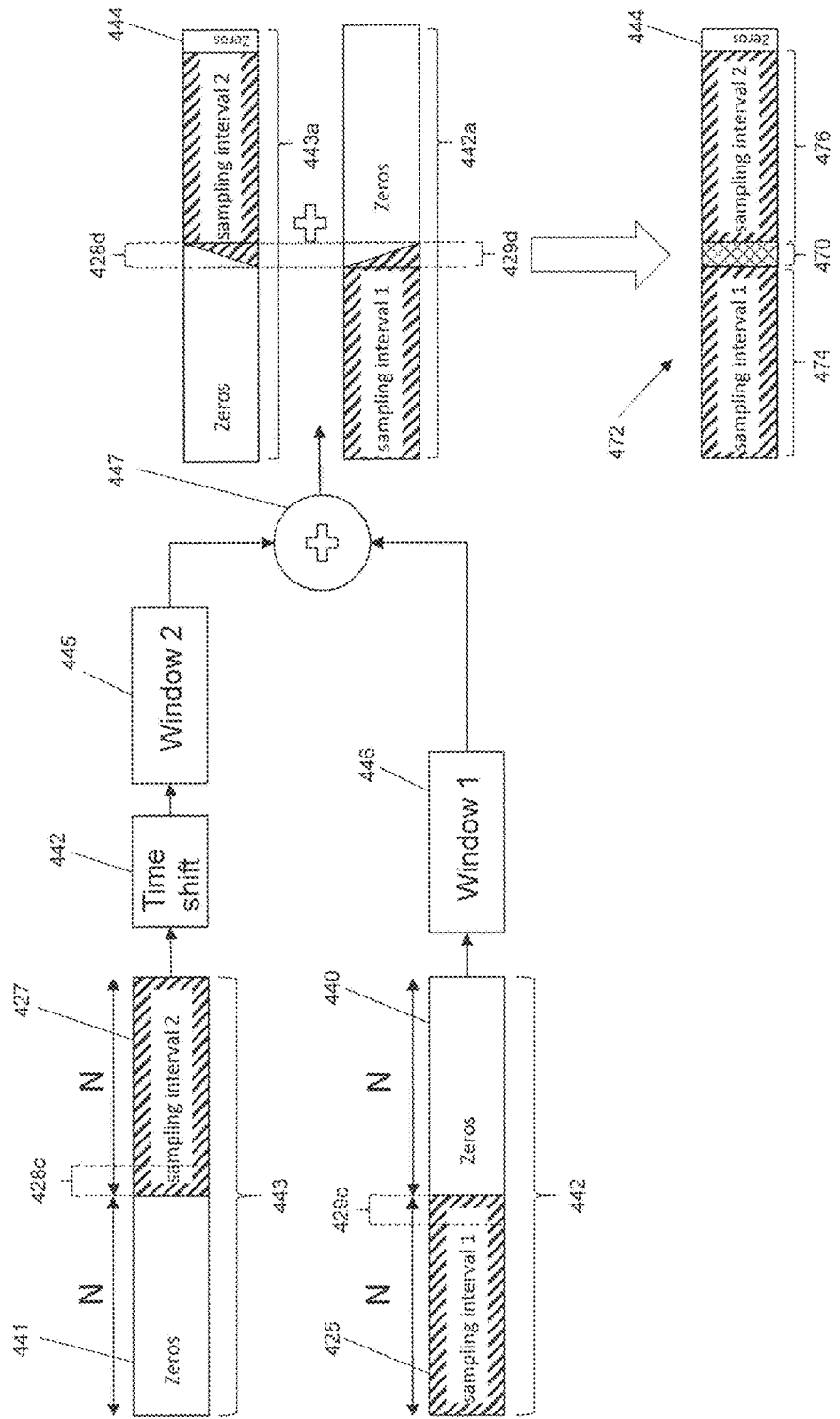
FIG. 4 illustrates schematically an example embodiment of how samples from a first acquisition interval can be combined with signals from a second acquisition interval.

FIG. 4 illustrates schematically an example embodiment of how samples from the first acquisition interval can be combined with signals from the second acquisition interval, in the time domain. In other examples however, the combination/correction technique can be applied in the frequency domain. This processing can be performed by the DSP of FIG. 1, which is an example of a receiver controller.

FIG. 4 shows a first-data-block 442 that includes a first-sampling-interval-block 425. The first-sampling-interval-block 425 corresponds to samples that are taken from the IF signal during the first acquisition interval, as it is shown in FIGS. 3a to 3c. FIG. 4 also shows a second-data-block 443 that includes a second-sampling-interval-block 427. The second-sampling-interval-block 427 corresponds to samples that are taken from the IF signal during the second acquisition interval, as it is shown in FIGS. 3a to 3c.

In this example, the DSP has separated the first-sampling-interval-block 425 and the second-sampling-interval-block 427 from the IF signal and padded with blocks of zeros 440, 441 to form the first-data-block 442 and the second-data-block 443. Each of the blocks of zeros 440, 441 has the same length/duration (N) as the first-sampling-interval-block 425 and the second-sampling-interval-block 427. The first-sampling-interval-block 425 is padded by appending a first block of zeros 440. The second-sampling-interval-block 427 is padded by prepending a second block of zeros 441.

As discussed above, the end of the first-sampling-interval-block 425 includes a settled-first-overlapping-portion 429c, and the start of the second-sampling-interval-block 427 includes a settled-second-overlapping-portion 428c.

The DSP, then applies a time shift operation 442 to the first-data-block 442 such that some of the first block of zeros 440 are removed. The duration of the number of zeros that are removed corresponds to the duration of the settled-first-overlapping-portion 429 and the settled-second-overlapping-portion 428.

The number of samples to overlap ($N_{overlap}$) can be calculated as follows:

$$N_{overlap} = \left\{F_{shift} - \left(T_{settle}\frac{\Delta f}{T_{ramp}}\right)\right\}\frac{T_{ramp}}{\Delta f}F_{sample} \tag{13}$$

where $F_{sample}$ equals the sampling frequency of the ADC that is shown in FIG. 1.

The DSP then applies a first windowing operation 446 to the settled-first-overlapping-portion 429c of the IF signal to provide a windowed-settled-first-overlapping-portion 429d, and applies a second windowing operation 445 to the settled-second-overlapping-portion 428c of the IF signal to provide a windowed-settled-second-overlapping-portion 428d. In this example, a triangular windowing function is used. However, it will be appreciated that other windowing functions can be used. The output of the first windowing operation 446 is a processed-first-data-block 442a. The output of the second windowing operation 445 is a processed-second-data-block 443a.

The DSP then combines, in this example adds together, the processed-first-data-block 442a and the processed-second-data-block 443a, which is shown schematically as an adder 447 in FIG. 4. This adding operation results in an output signal 472 that includes:
- a combined-first-portion 474, which is based on a combination of the transmit-first-non-overlapping-portion and the received-first-non-overlapping-portion;
- a combined-overlapping-portion 470, which in the result of combining the windowed-settled-first-overlapping-portion 429d and the windowed-settled-second-overlapping-portion 428d. This is one example of combining (i) a transmit-first-overlapping-portion, (ii) a transmit-second-overlapping-portion, (iii) a received-first-overlapping-portion, and (iv) a received-second-overlapping-portion, because the windowed-settled-first-overlapping-portion 429d and the windowed-settled-second-overlapping-portion 428d are derived from these four portions; and
- a combined-second-portion 476 based on a combination of the transmit-second-non-overlapping-portion and the received-second-non-overlapping-portion.

A distance to one or more reflecting objects can then be determined based on the output signal 472.

Due to the zero padding and time shifting that has previously been applied, the adding operation can be considered as adding the overlapping samples together, and appending the remaining samples of sampling interval 2 427 to the new sampling interval 1 425.

Optionally, further zero padding can applied to increase the length of the new acquisition interval to twice the length (N) of sampling interval 1 425. These additional zeros 444 are included at the end of the processed-second-data-block 443a, after the first-sampling-interval-block 427.

The new acquisition interval (the output of the adder 447) can then be processed as if it was a single frequency ramp. Thus, in a next step, the DSP can apply additional windowing, for example using a Chebyshev window. The resultant windowed signal can then be transformed to the frequency domain by a FFT of twice the length of the first acquisition interval (N). In subsequent processing steps, a second FFT can be executed over multiple chirp signals to estimate the Doppler frequency as explained below with reference to FIG. 7.

The overlapping technique described above with reference FIG. 4 can reduce transient effects than can occur at the start of a new chirp.

Measurement Results

The technique described above with reference to FIGS. 3 and 4 has been implemented and tested on a radar front-end. The tests were executed in an anechoic room. The results are shown in FIGS. 5a, 5b and 6, and are discussed below.

Figure 5A:
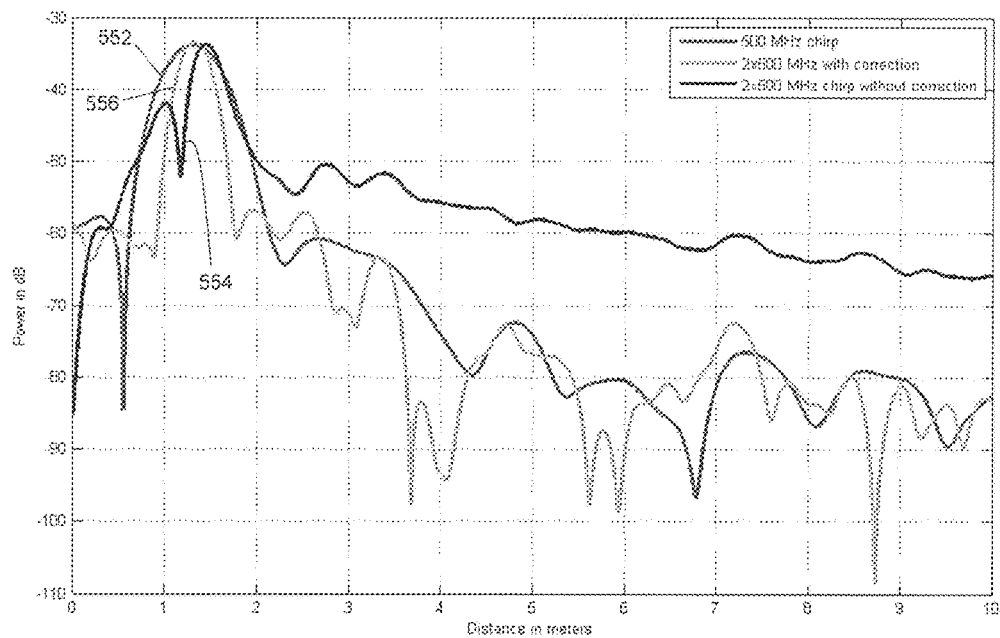
FIGS. 5a and 5b show a plot of power on the vertical axis versus distance on the horizontal axis, for a system tested with a single corner reflector.
Figure 5B:
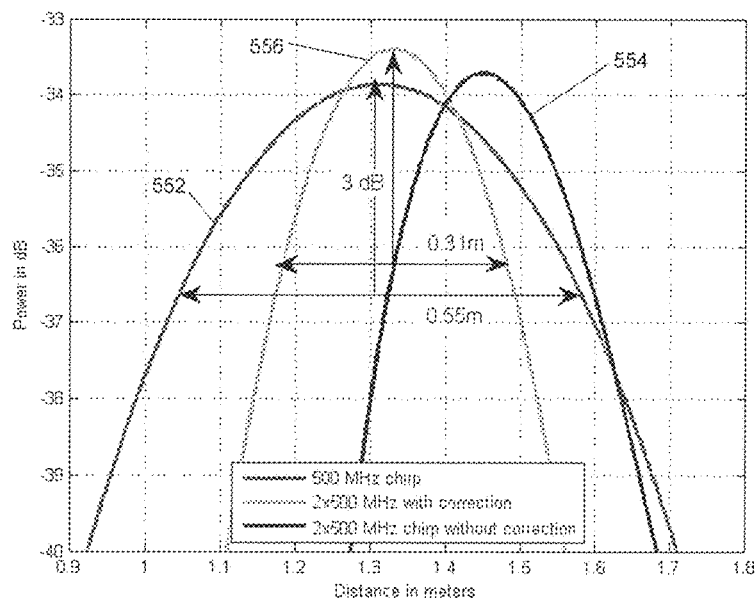

FIGS. 5a and 5b shows a plot of power on the vertical axis versus distance on the horizontal axis. Measurements are shown for a system tested with a single corner reflector at a distance of about 1.2 m. FIG. 5b shows a zoomed-in region of the plots at the distance of about 1.2 m A first plot 552 shows the results for a 500 MHz chirp, such as the one illustrated in FIG. 2.

A second plot 554 shows the results for two combined 500 MHz chirps, such as the ones illustrated in FIGS. 3a to 3c, but without the phase correction that is described with reference to FIG. 4.

A third plot 556 shows the results for two combined 500 MHz chirps, such as the ones illustrated in FIGS. 3a to 3c, with the phase correction that is described with reference to FIG. 4.

The second and third plots 554, 556 represent measurement result using two 500 MHz chirps to emulate a 1 GHz chirp. A 25.6 µs single acquisition interval was used, a Chebyshev window with 70 dB side lobes, and an effective chirp bandwidth of 420 MHz.

FIG. 5b also includes 3 dB markers, which indicate that the resolution for the first plot 552 is 0.55 m and the resolution for the third plot 556 is better, at 0.31 m. The corresponding resolution of a single 1 GHz chirp is 0.28 meters. FIG. 5b also shows that the third plot 556 provides a more accurate indication of the distance to the corner reflector than the second plot 554.

FIG. 6 shows a plot of power on the vertical axis versus distance on the horizontal axis. Measurements are shown for a system tested with two corner reflectors in close proximity at 0.8 and 1.2 meters.

In the same way as FIG. 5, a first plot 662 shows the results for a 500 MHz chirp, a second plot 664 shows the results for two combined 500 MHz chirps without phase correction, and a third plot 666 shows the results for two combined 500 MHz chirps with phase correction.

It is clear from FIG. 6 that the third plot 666 show two peaks (which correctly represent the two corner reflectors) whereas the uncorrected result of the second plot 664 shows a ghost, third, target. Furthermore, the first plot 662, which represents a single 500 MHz chirp, is not capable of resolving both reflectors.

Relative Radial Velocity

As mentioned above, the two dimensional Fast Fourier Transformation (FFT) can be used to calculate the relative radial velocity.

FIG. 7 shows schematically a two dimensional FFT. In a first step 702 each received chirp is converted to the frequency domain by means of a FFT operation and stored in a row by row fashion. In a second step 704 a FFT operation is performed over all the samples in a single column. This operation is performed for all columns.

One or more examples disclosed herein relate to a technique for improving distance resolution by means of concatenating multiple radar waveforms in a radar waveform generator. For example, large bandwidth emulation for automotive radar systems can be provided by means of concatenation of multiple frequency ramps. A frequency modulated continuous waveform is described, which combines two frequency ramps with an offset in start frequency, into a single ramp with the goal of increasing the distance resolution.

As described above, a distance dependent, linear phase correction term can applied to the samples corresponding to the second frequency ramp. This correction can be implemented by a time shift in time domain. The samples corresponding to the second ramp can then be partially overlapped with the last samples of the first ramp. The obtained vector can then be windowed and transformed to the frequency domain.

Examples disclosed herein can address resolution limitations due to limited chirp bandwidth that can be caused by limitations of a Voltage Controlled Oscillator in a waveform generator PLL. The examples also address phase distortion, which can arise due to a concatenation of FMCW frequency ramps with equal frequency slope and duration but with different start frequencies. Small deviations in amplitude due to transients at the beginning and end of the chirp signal can also be addressed.

A FMCW based radar system is disclosed in which two or more frequency ramps are combined into a single frequency ramp with the goal of increasing the distance resolution of the radar system. A FMCW based radar system as disclosed herein can transmit a sequence of frequency ramps, wherein a single ramp is made up of multiple sub-ramps. Each of these multiple subs-ramps can have a starting frequency which is close to the frequency at which the previous sub ramp ended. In between the transmission of these multiple sub-ramps the PLL can switch between filter banks. A phase correction technique in the digital baseband of the radar system can be used to remove the phase discontinuity between two consecutive frequency sub-ramps. A technique is provided in which the second transmitted frequency sub-ramp has a time interval at the beginning of its acquisition interval in which the instantaneous frequencies are equal to the instantaneous frequencies during a time interval at the end of the first sub-ramp. A digital signal processing technique can be used in which part of the last first chirp acquisition interval is added to a first part of the second term. The addition can be weighted by window functions.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A radar system comprising:
a) an oscillator;
b) a transmitter controller integrated circuit, configured to control the oscillator such that the oscillator provides a transmit-radar-signal, wherein the transmit-radar-signal comprises:
   a transmit-first-ramp-frequency-portion, during which the frequency of the transmit-radar-signal either increases or decreases over time;
   a transmit-first-returning-frequency-portion, during which the frequency of the transmit-radar-signal changes in the opposite way to the transmit-first-ramp-frequency-portion; and
   a transmit-second-ramp-frequency-portion, during which the frequency of the transmit-radar-signal changes in the same way as the transmit-first-ramp-frequency-portion;
   wherein the transmit-first-ramp-frequency-portion includes:
      a transmit-first-overlapping-portion, and
      a transmit-first-non-overlapping-portion;
   wherein the transmit-second-ramp-frequency-portion includes:
      a transmit-second-overlapping-portion that corresponds to the instantaneous frequency of the transmit-first-frequency-overlapping-portion; and
      a transmit-second-non-overlapping-portion;
   wherein the transmitter controller integrated circuit is configured to reconfigure the oscillator from a first-operating-mode to a second-operating-mode between the transmit-first-ramp-frequency-portion and the transmit-second-ramp-frequency-portion; and
c) a receiver controller integrated circuit configured to:
   receive a received-radar-signal that represents a reflected version of the transmit-radar-signal, wherein the received-radar-signal includes:

a received-first-ramp-frequency-portion, during which the frequency of the received-radar-signal changes in the same way as the transmit-first-ramp-frequency-portion;

a received-first-returning-frequency-portion, during which the frequency of the received-radar-signal changes in the opposite way to the transmit-first-ramp-frequency-portion;

a received-second-ramp-frequency-portion, during which the frequency of the received-radar-signal changes in the same way as the transmit-first-ramp-frequency-portion; and wherein the received-radar-signal includes:

a received-first-overlapping-portion, received at the same time as the transmit-first-overlapping-portion, and a received-first-non-overlapping-portion, received at the same time as the transmit-first-non-overlapping-portion;

a received-second-overlapping-portion, received at the same time as the transmit-second-overlapping-portion, and a received-second-non-overlapping-portion, received at the same time as the transmit-second-non-overlapping-portion;

provide a combined-overlapping-portion based on a combination of the transmit-first-overlapping-portion, the transmit-second-overlapping-portion, the received-first-overlapping-portion, and the received-second-overlapping-portion;

provide a combined-first-portion based on a combination of the transmit-first-non-overlapping-portion and the received-first-non-overlapping-portion;

provide a combined-second-portion based on a combination of the transmit-second-non-overlapping-portion and the received-second-non-overlapping-portion;

provide an output signal in accordance with:
the combined-overlapping-portion;
the combined-first-portion; and
the combined-second-portion.

2. The radar system of claim 1, wherein the transmitter controller integrated circuit is configured to operate the oscillator in the first-operating-mode to provide the first-ramp-frequency-portion of the transmit-radar-signal, and wherein the transmitter controller integrated circuit is configured to operate the oscillator in the second-operating-mode to provide the second-ramp-frequency-portion of the transmit-radar-signal.

3. The radar system of claim 1, wherein, in order to provide the combined-overlapping-portion, the receiver controller integrated circuit is configured to:

multiply the transmit-first-overlapping-portion by the received-first-overlapping-portion in order to provide a first-overlapping-portion;

multiply the transmit-second-overlapping-portion by the received-second-overlapping-portion in order to provide a second-overlapping-portion apply a windowing function to the first-overlapping-portion to provide a windowed-first-overlapping-portion;

apply a windowing function to the second-overlapping-portion to provide a windowed-second-overlapping-portion;

combine the windowed-first-overlapping-portion with the windowed-second-overlapping-portion to provide the combined-overlapping-portion.

4. The radar system of claim 3, wherein the receiver controller integrated circuit is configured to combine the windowed-first-overlapping-portion with the windowed-second-overlapping-portion by adding the windowed-first-overlapping-portion to the windowed-second-overlapping-portion.

5. The radar system of claim 1, wherein, in order to provide the combined-overlapping-portion, the receiver controller integrated circuit is configured to:

multiply the transmit-first-overlapping-portion by the received-first-overlapping-portion in order to provide a first-overlapping-portion;

multiply the transmit-second-overlapping-portion by the received-second-overlapping-portion in order to provide a second-overlapping-portion;

determine a settled-second-overlapping-portion of the second-overlapping-portion, wherein the settled-second-overlapping-portion has a settled frequency value, and wherein the settled-second-overlapping-portion corresponds to the transmit-radar-signal having a second-settled-frequency-range;

determine a settled-first-overlapping-portion of the first-overlapping-portion, and wherein the settled-first-overlapping-portion corresponds to the transmit-first-overlapping-portion having a first-settled-frequency-range, and wherein the first-settled-frequency-range is the same as the second-settled-frequency-range;

apply a windowing function to the settled-first-overlapping-portion to provide a windowed-settled-first-overlapping-portion;

apply a windowing function to the settled-second-overlapping-portion to provide a windowed-settled-second-overlapping-portion; and combine the windowed-settled-first-overlapping-portion with the windowed-settled-second-overlapping-portion to provide the combined-overlapping-portion.

6. The radar system of claim 5, wherein the receiver controller integrated circuit is configured to combine the windowed-settled-first-overlapping-portion with the windowed-settled-second-overlapping-portion by adding the windowed-settled-first-overlapping-portion to the windowed-settled-second-overlapping-portion.

7. The radar system of claim 1, wherein the receiver controller integrated circuit is configured to provide the combined-first-portion by multiplying together the transmit-first-non-overlapping-portion and the received-first-non-overlapping-portion.

8. The radar system of claim 1, wherein the receiver controller integrated circuit is configured to provide the combined-first-portion by multiplying together the transmit-first-non-overlapping-portion and the received-first-non-overlapping-portion, and removing an unsettled-portion from the result of the multiplication.

9. The radar system of claim 1, wherein the receiver controller integrated circuit is configured to provide the combined-second-portion by multiplying together the transmit-second-non-overlapping-portion and the received-second-non-overlapping-portion.

10. The radar system of claim 1, wherein the transmitter controller integrated circuit is configured to control the oscillator such that the transmit-radar-signal also comprises:

a transmit-first-constant-frequency-portion, during which the frequency of the transmit-radar-signal is kept substantially constant;

wherein the transmit-first-constant-frequency-portion is after the transmit-first-returning-frequency-portion and before the transmit-second-ramp-frequency-portion.

11. The radar system of claim 10, wherein the transmitter controller integrated circuit is configured to reconfigure the oscillator from the first-operating-mode to the second-operating-mode during the transmit-first-constant-frequency-portion.

12. The radar system of claim 10, wherein the transmitter controller integrated circuit is configured to set the duration of the transmit-first-constant-frequency-portion such that it is at least as long as the time difference between the transmit-radar-signal and the received-radar-signal.

13. The radar system of claim 1, wherein the transmitter controller integrated circuit is configured to control the oscillator such that the transmit-radar-signal also comprises:
   a transmit-second-returning-frequency-portion, during which the frequency of the transmit-radar-signal changes in the opposite way to the transmit-first-ramp-frequency-portion;
   wherein the transmit-second-returning-frequency-portion is after the transmit-second-ramp-frequency-portion.

14. The radar system of claim 1, wherein the receiver controller integrated circuit is further configured to determine a distance to a reflecting object based on the output signal.

15. A method for operating a radar system, the method comprising:
   a) at a transmitter controller, controlling an oscillator such that the oscillator provides a transmit-radar-signal, wherein the transmit-radar-signal comprises:
      a transmit-first-ramp-frequency-portion, during which the frequency of the transmit-radar-signal either increases or decreases over time;
      a transmit-first-returning-frequency-portion, during which the frequency of the transmit-radar-signal changes in the opposite way to the transmit-first-ramp-frequency-portion; and
      a transmit-second-ramp-frequency-portion, during which the frequency of the transmit-radar-signal changes in the same way as the transmit-first-ramp-frequency-portion;
      wherein the transmit-first-ramp-frequency-portion includes:
         a transmit-first-overlapping-portion, and
         a transmit-first-non-overlapping-portion;
      wherein the transmit-second-ramp-frequency-portion includes:
         a transmit-second-overlapping-portion that corresponds to the instantaneous frequency of the transmit-first-frequency-overlapping-portion; and
         a transmit-second-non-overlapping-portion;
      wherein the transmitter controller is configured to reconfigure the oscillator from a first-operating-mode to a second-operating-mode between the transmit-first-ramp-frequency-portion and the transmit-second-ramp-frequency-portion; and
   b) at a receiver controller:
      receiving a received-radar-signal that represents a reflected version of the transmit-radar-signal, wherein the received-radar-signal includes:
         a received-first-ramp-frequency-portion, during which the frequency of the received-radar-signal changes in the same way as the transmit-first-ramp-frequency-portion;
         a received-first-returning-frequency-portion, during which the frequency of the received-radar-signal changes in the opposite way to the transmit-first-ramp-frequency-portion;
         a received-second-ramp-frequency-portion, during which the frequency of the received-radar-signal changes in the same way as the transmit-first-ramp-frequency-portion; and
      wherein the received-radar-signal includes:
         a received-first-overlapping-portion, received at the same time as the transmit-first-overlapping-portion, and
         a received-first-non-overlapping-portion, received at the same time as the transmit-first-non-overlapping-portion;
         a received-second-overlapping-portion, received at the same time as the transmit-second-overlapping-portion, and
         a received-second-non-overlapping-portion, received at the same time as the transmit-second-non-overlapping-portion;
      providing a combined-overlapping-portion based on a combination of the transmit-first-overlapping-portion, the transmit-second-overlapping-portion, the received-first-overlapping-portion, and the received-second-overlapping-portion;
      providing a combined-first-portion based on a combination of the transmit-first-non-overlapping-portion and the received-first-non-overlapping-portion;
      providing a combined-second-portion based on a combination of the transmit-second-non-overlapping-portion and the received-second-non-overlapping-portion;
      providing an output signal in accordance with:
         the combined-overlapping-portion;
         the combined-first-portion; and
         the combined-second-portion.

* * * * *